United States Patent [19]

Didomizio

[11] Patent Number: 5,559,517
[45] Date of Patent: Sep. 24, 1996

[54] MAXIMIZED/MINIMIZED PHASE CALCULATOR FOR AN INTERFEROMETRIC AMTI RADAR

[75] Inventor: John A. Didomizio, Norwalk, Conn.

[73] Assignee: Northrop Grumman Corporation, Los Angeles, Calif.

[21] Appl. No.: 325,523

[22] Filed: Nov. 27, 1981

[51] Int. Cl.[6] .................................................... G01S 13/00
[52] U.S. Cl. ............................................ 342/156; 342/174
[58] Field of Search ............................... 343/5 CM, 5 FT, 343/7.7, 768; 342/156, 174

[56] References Cited

U.S. PATENT DOCUMENTS

| 4,086,590 | 4/1978 | Goggins, Jr. | 343/5 CM |
| 4,217,583 | 8/1980 | Hiller et al. | 343/7.7 |

Primary Examiner—Theodore M. Blum

[57] ABSTRACT

An AMTI radar employs a dual cancellation format to cancel the clutter in the radar returns received by the apertures of an interferometric radar antenna. Angle information generated on a first pass through the cancellation unit and the detection processor is recalculated in a second pass. Only those range doppler cells identified during the first pass as containing moving targets are used in the second angle calculation thereby enhancing the accuracy of this second angle measurement. This three-aperture system derives four data sets, $L(t)$, $C(t-\tau)$, $C(t)$ and $R(T-\tau)$ which represent samples taken over multiple pulse repetition intervals for each range interval or bin of interest. Fast Fourier transforms change the data sets into the frequency domain and phase compensations for the data sets are calculated in a triple interferometric signal calibration unit. Compensation phase is further adjusted in the maximized/minimized phase calculator allowing a much reduced phase quantity to be applied to the delayed data sets. Following subtraction of doppler filter outputs of the delayed data sets from the undelayed data sets in the cancellation unit, maximum clutter cancellation is achieved in the clutter region and optimal moving target response is obtained in the clutter-free region. The two-range maps that result after subtraction of the doppler filter outputs are presented to a detection and validation processor to determine range, doppler, amplitude and angle measurements to the moving targets.

4 Claims, 7 Drawing Sheets

FIG. 1

INTERFEROMETRIC SIGNAL CALIBRATION UNIT

FIG. 2

FIG. 4
CANCELLATION/ENHANCEMENT UNIT

MAXIMIZED/MINIMIZED PHASE CALCULATOR FOR AN INTERFEROMETRIC AMTI RADAR

CROSS REFERENCE TO RELATED APPLICATIONS

The subject matter of this patent application is related to that disclosed in U.S. patent application Ser. No. 325,522, filed Nov. 27, 1981, by J. DiDomizio and R. Guarino for DUAL CANCELLATION INTERFEROMETRIC AMTI RADAR and to U.S. patent application Ser. No. 325,521 filed Nov. 27, 1981, by J. Alimena and R. Briones for CHANNEL SWITCHING INTERFEROMETRIC AMTI RADAR, and U.S. patent application Ser. No. 325,524, filed Nov. 27, 1981, by John A. DiDomizio for LOW TARGET VELOCITY INTERFEROMETRIC AMTI RADAR, all which are assigned to the same assignee as the present case.

TECHNICAL FIELD

This invention relates to an aircraft mounted synthetic aperture radar system and, more particularly, to a AMTI radar system that includes a maximized/minimized phase calculation technique which is well suited for use with an interferometric processing technique to enhance target identification in the radar returns.

BACKGROUND ART

An airborne moving target indicator (AMTI) radar is generally known and is the type of radar that has the capability to reject or cancel signals from fixed, or unwanted targets (non-movers), such as buildings, hills, etc. At the same time, such radars typically highlight or enhance the radar return signals from any moving targets (movers) such as aircraft, vehicles, or the like. One technique used in AMTI radar of the coherent type involves utilizing the doppler shift imparted to the reflected radar signals by a moving target as a part of a processing scheme to distinguish a mover from a non-mover. This doppler shift appears as a change in the phase of the received signals between consecutive illuminating radar pulses.

There are a number of problems which must be considered in the processing of radar returns where the AMTI radar is mounted in an aircraft. Because the aircraft is moving with respect to both the fixed and moving targets, the radar returns from both target and clutter experience a frequency shift which can be corrected by known motion compensation techniques.

Synthetic-aperture radars are also generally known and such systems generally use a multiaperture antenna together with the movement of the platform on which the antenna is mounted as additional inputs into the processing of return signals in an AMTI radar. While this adds significantly to the complexity of the processing of the radar return signals, clutter cancellation to identify the movers can be significantly enhanced.

One well-known method of compensating for the effects of aircraft motion is known as displaced phase center technique and involves electronically displacing the antenna phase center along the flight path of the aircraft. Briefly, the technique involves the transmission and reception of radar returns by the antenna of the radar system having its phase center at a first known location. A second illuminating pulse is then transmitted and the return stored while the antenna has its phase center at a second known location. The phase centers of the first and second returns are separated by a precisely known distance related to the movement of the aircraft during the interpulse period and, knowing this information, the phase centers can electrically be changed to essentially coincide in time. At that point, the signals received by the multiaperture antenna from clutter, or stationary objects, will have properties suitable to cancellation, leaving only the movers to be detected.

One technique for clutter cancellation is described in U.S. Pat. No. 4,093,950 issued Jun. 6, 1978 to ap Rhys for MOTION-COMPENSATION ARRANGEMENTS FOR MTI RADARS. The clutter suppression technique described in this patent is not limited to two pulses at a time but may be applied to a number of pulses. Phase and amplitude adjustments are also made to minimize the effects of antenna construction errors. The antenna subarray have phase centers which are separated by 2VT. The sum and difference signals from each to adjacent subarray are taken to produce a sum channel and a difference channel for each group of subarrays. After adjustment of the difference channel signal in phase and amplitude, the latest return is added to a delayed return to produce a correction signal. That correction signal is then added to a delayed signal in the corresponding sum channel to provide a signal that is synchronized in time and phase with the most recent signal in the sum channel.

U.S. Pat. No. 3,735,400 issued May 22, 1973 to C. Sletten and F. S. Holt for AMTI RADAR CLUTTER CANCELING METHOD AND APPARATUS describes a three-aperture simultaneous mode clutter cancellet. This clutter cancellation technique is based on the premise that the return signals from stationary targets on the ground arrive at two antenna apertures with a unique and nearly linearly related phase delay as a function of doppler frequency if the antennas are displaced laterally along the aircraft flight path. Ground clutter cancellation can be achieved by a filter that separates the doppler spectrum into narrow channels and applies a given phase shift or delay to the returns in the narrow bandpass filter. Three channels of signal information from a three-aperture antenna are reduced to two clutter cancel channels. Range integrations and phase comparisons are performed on each channel of information to provide target detection and angle measurement. One of the limiting characteristics of this processing technique is that the antennas must be in a line coincident with the velocity vector of the aircraft. Also, each of the antenna apertures are spaced apart by a fraction of a wavelength, in this particular case one quarter of a wavelength. Another limitation is that the transmit aperture, this being one of the three receive apertures, is the same aperture as one of the receive apertures and so the transmit and receive antenna beamwidths are identical. This is significant because the resultant doppler spectra in each of the channels is not highly influenced by each beamwidth pattern of the individual receive apertures. Another limitation to this approach is that the aircraft velocity must be sufficiently large to provide a clutter spectrum of 50 channels or more. Still another limitation of this technique is that the bandpass filters are controlled by information from the aircraft navigation sensor which inherently has potential errors which should be considered and corrected. Another problem with this processing technique is that it utilizes only three doppler filtering processes which necessarily provides less information than a system which incorporates a larger number of filtering processes. And finally, although this disclosed technique has a means for compensating for antenna calibration errors, it does not include any compensation by the receive signals to correct for velocity and/or boresite errors.

DISCLOSURE OF INVENTION

It is an object of the present invention to provide an airborne moving target indicator (AMTI) radar in which a maximized/minimized phase calculation technique is used to enhance both moving target detectability and the-angle measurements to moving targets.

A particular feature of the maximized/minimized phase calculation technique according to the present invention is that the angle information generated on a first pass through the cancellation unit and the detection processor is recalculated. The doppler calculation from the first pass is fed back to the maximized/minimized phase calculator and reprocessed through the cancellation process. In this second pass only those range doppler cells identified during the first pass as containing moving targets are used in the second angle calculation thereby enhancing the accuracy of this second angle measurement.

Yet another feature of the maximized/minimized phase calculation technique according to the present invention is that target .detection is enhanced by optimizing the phase correction for optimum target-to-clutter plus noise.

A feature of the dual cancellation interferometric AMTI radar according to the present invention is that the disclosed technique is not limited to a side-looking radar. Stated differently, it is not necessary that the antenna apertures be oriented along a line which is coincident with the velocity vector of the aircraft. This means that the antenna apertures can be mechanically rotated to any desired direction.

According to another feature of the dual cancellation interferometric AMTI radar of the present invention, the receive apertures of the radar antenna are spaced apart from adjacent apertures by a number of wavelengths. This is significant because it allows the apertures to be much larger in size and also allows the phase centers to be further apart for more angle accuracy.

Another feature of the dual cancellation interferometric AMTI radar according to the present invention is that the three receive apertures are used together as a transmit aperture so that the transmit antenna beamwidth is one-third as narrow as each of the receive antenna beamwidths. This is meaningful because the resulting doppler spectra in each of the receive channels is not highly influenced by the beam-width pattern of the individual receive apertures.

An advantage of the dual cancellation interferometric AMTI radar according to the present invention is that the operation is not constrained by low platform velocity. In other words, it is not necessary to have the aircraft move at a sufficiently high speed to obtain an adequate clutter spectrum for the doppler samples.

Another advantage of the dual cancellation interferometric AMTI radar of the present invention is that it includes a compensation means based on the data itself to correct for errors which might be associated with reference signals from a navigation system.

Still another feature of the dual cancellation interferometric AMTI radar of the present invention is that four doppler filtering processes are performed on the data in the three receive channels to generate precise phase compensation for the radar return signals in the clutter spectrum.

Yet another feature of the dual cancellation interferometric AMTI radar according to the present invention is that it compensates the receive signals for inaccuracies associated with velocity and/or boresite errors.

The foregoing and other objects, features and advantages of the present invention will become more apparent from the following description of preferred embodiments and accompanying drawings.

BEST MODE FOR CARRYING OUT THE INVENTION

Figure 1:
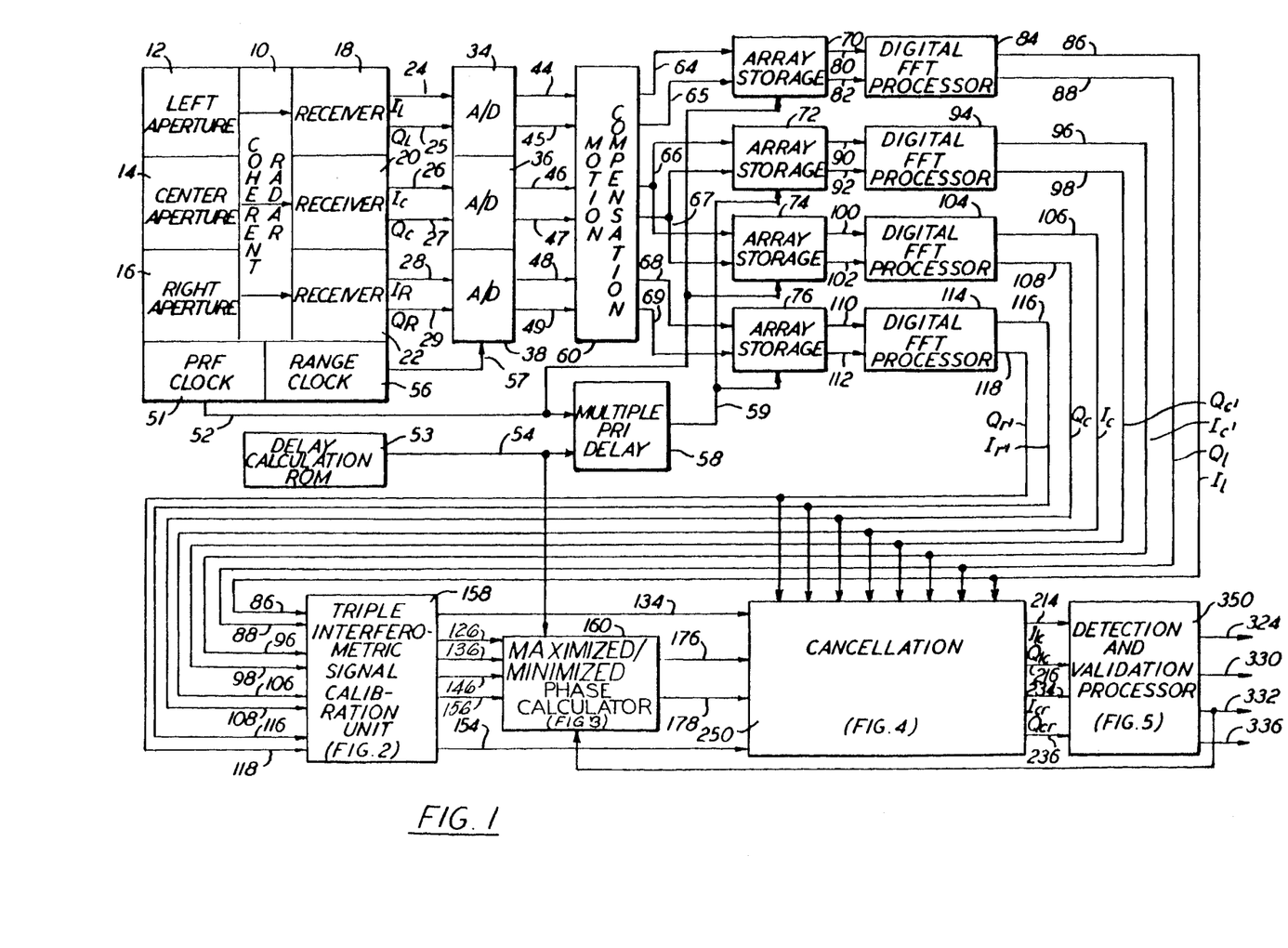
FIG. 1 is a block diagram drawing of one embodiment of a dual cancellation interferometric AMTI radar system which includes a maximized/minimized phase calculator according to the present invention.

Referring initially to FIG. 1, there is seen one embodiment of a dual cancellation interferometric AMTI radar that includes the maximized/minimized phase calculator according to the present invention. This combined technique is particularly well suited to suppressing clutter in a radar system whose performance is constrained by the effects of platform motion. The present invention is utilized in the processing of signals acquired by a radar 10 of the coherent type which is known in the art. The radar system includes a left aperture 12, a center aperture 14 and a right aperture 16 that are provided by an array antenna, or the like. Each aperture provides a signal indicative of radar returns to a receiver 18, a receiver 20 and a receiver 22. It should be noted that the antenna beamwidths of the left, center and right apertures are substantially identical and are broader than the illuminating aperture beamwidth (the illuminating aperture beam is more narrow by a factor of 3), this illuminating aperture being formed by the combined left, center and right apertures. As a consequence of this characteristic, the clutter doppler spectra received by each individual aperture is defined primarily by the transmit pattern providing for a high degree of clutter cancellation. As is known, each of the receivers typically convert the radar signals received at the RF frequency range, first to an IF frequency then to a video signal of two different channels that are shifted in phase by 90°. In other words, the receiver 18 for the left aperture has as outputs an in-phase component ($I_L$) 24 and a quadrature component ($Q_L$) 25, the receiver 20 for the center aperture 14 has as outputs an in-phase component ($I_C$) 26 and a quadrature component ($Q_C$) 27, and the receiver 22 for the right channel has as outputs an in-phase channel ($I_R$) 28 and a quadrature component ($Q_R$) 29.

The I and Q video signals from the receivers 18, 20 and 22 are provided to analog-to-digital (A/D) converters 34, 36 and 38, respectively, so that the signals on the lines 44 and 45, the lines 46 and 47, and the lines 48 and 49 are digital representations of the magnitude of an in-phase component I and a quadrature component Q of each signal received by the radar apertures. It should be understood that the remainder of the disclosure is digital in nature and for simplicity the graphic representations in FIG. 1 are shown as having connections of individual signal lines rather than trunks of lines which normally accommodate the number of binary signals involved herein. It also should be understood that the signals described hereinafter are the actual radar return signals or signals upon which modifications or changes have been performed in accordance with the described process. All quantizing processes are performed with the requisite degree of fineness such that there is no significant errors that arise as a result of quantization noise.

The coherent radar 10 includes a pulse repetition frequency (PRF) clock 51 to provide timing signals on the line 52 related to each transmission, or illuminating pulse, from the radar system. A particular feature of the present invention is that the PRF utilized in this configuration is not restricted to any relationship in which aircraft motion perpendicular to the antenna orientation in a pulse repetition interval (PRI) must be a fixed factor of antenna array spacing. In addition, a range clock 56 provides a high frequency timing signal on the line 57 defining each of the range bins associated with the returned radar signals and also provides sampling strobes for each of the A/D converters.

The I and I Q signals, in digital form, from the left aperture 12, the center aperture 14, and the right aperture 16 are fed to a motion compensation unit 60. An inertial navigation system, (not shown), or other similar system, on the radar platform provides digital signals indicating platform motion to the motion compensation unit. The received radar signals are complex multiplied by the signals received from the inertial navigation system. A complex multiplier circuit is generally known in the art and the purpose of the complex multiplier is to rotate the incoming radar signal in any given range bin during a given PRI by another signal that represents the platform motion with respect to the range bin of interest. This results in the compensation of the data for platform motion thus correcting for the doppler frequency at the center of the radar beam. The signals from the motion compensation unit 60 are on the lines 64 through 69 and these signals represent the in-phase component I and quadrature component Q of the motion compensated signals received by the left, center and right apertures, respectively.

Four bulk memory devices are used for array storage; memory 70, memory 72, memory 74 and memory 76. Each memory device is of sufficient size to record $N_d$ PRIs of data for each of $N_r$ range bins. The memories 72 and 74 accept data from the center aperture receiver, the memory 70 accepts data from the left aperture and the memory 76 accepts data from the right aperture. A particular feature of the present invention is that the data in these bulk memories is read in at different times. In other words, there are two separate time periods in which data is recorded, one for the left and a center device together and the other for the right and the other center device together. The data gate 52 that controls the left and the center allows the storage of the first $N_d$ samples taken (i.e., samples 1 through $N_d$) whereas the data gate 59 that controls the center and the right allows the storage of $N_d$ samples delayed in time by N Pris (i.e., samples 1+N through $N_d$+N) through the multiple PRI delay unit 58. The data gate delay is controlled by line 54 from the delay calculation read only memory (ROM) 53.

One feature of the present invention is that the multiple PRI delay for the optimum clutter cancellation is calculated in a delay calculation ROM 53. The delay calculation ROM 53 has three inputs, aircraft velocity v, pulse repetition frequency $f_r$ and interarray spacing d. The output of the delay calculation ROM 53 on the line 54 is the number of PRI delays, N, such that $|(d/2v) - N/f_r|$ is minimized. The interarray spacing, d, is a constant for all signal sets, the number of different pulse repetition frequencies, $f_r$, are limited and the aircraft velocity, v, can be quantized to a low bit level so that the output, N, will generally be a small set of numbers which can be represented by a simple digital code when stored in the ROM.

A particular feature of the present invention is that Fourier transforms of all of the data points are taken so that phase corrections for clutter cancellation can be applied in the frequency domain thus removing constraints inherently imposed by time domain cancellation. Accordingly, a digital FFT processor 84 is connected by the lines 80 and 82 to the memory 70 for the left aperture and transforms the time history contained therein to $I_1$ and $Q_1$ signals on the lines 86 and 88 which provide a frequency domain representation of the received data. A digital FFT processor 94 is connected to the array storage device 72 by the lines 90 and 92 and provides a comparable signal transform to the frequency domain for signals $I_c$ and $Q_c$, on the lines 96 and 98. A digital FFT processor 104 receives data stored in the array storage 74 in time sequence on the lines 100 and 102 and transforms this information into frequency domain signals $I_{c'}$ and $Q_{c'}$ on the lines 106 and 108. Likewise, a digital FFT processor 114 receives data from the right aperture that is stored in the array storage 76 on the lines 110 and 112, and provides output signals $I_{r'}$ and $Q_{r'}$ on the lines 116 and 118 which corresponds to this data in the frequency domain. The primed subscripts used (i.e., $I_{c'}$) indicate delayed data sets while the unprimed subscripts (i.e., $I_1$) indicate undelayed data sets. In other words, each FFT processor converts the $N_d$ samples of the time history, of each of the returns in $N_r$ range bins, into the corresponding $N_d$ samples of frequency domain information. At the output of each FFT processor we have the frequency characteristics for each range bin, this being referred to as a range doppler map, of a size $N_r$ range bins by $N_d$ doppler filters.

Figure 2:
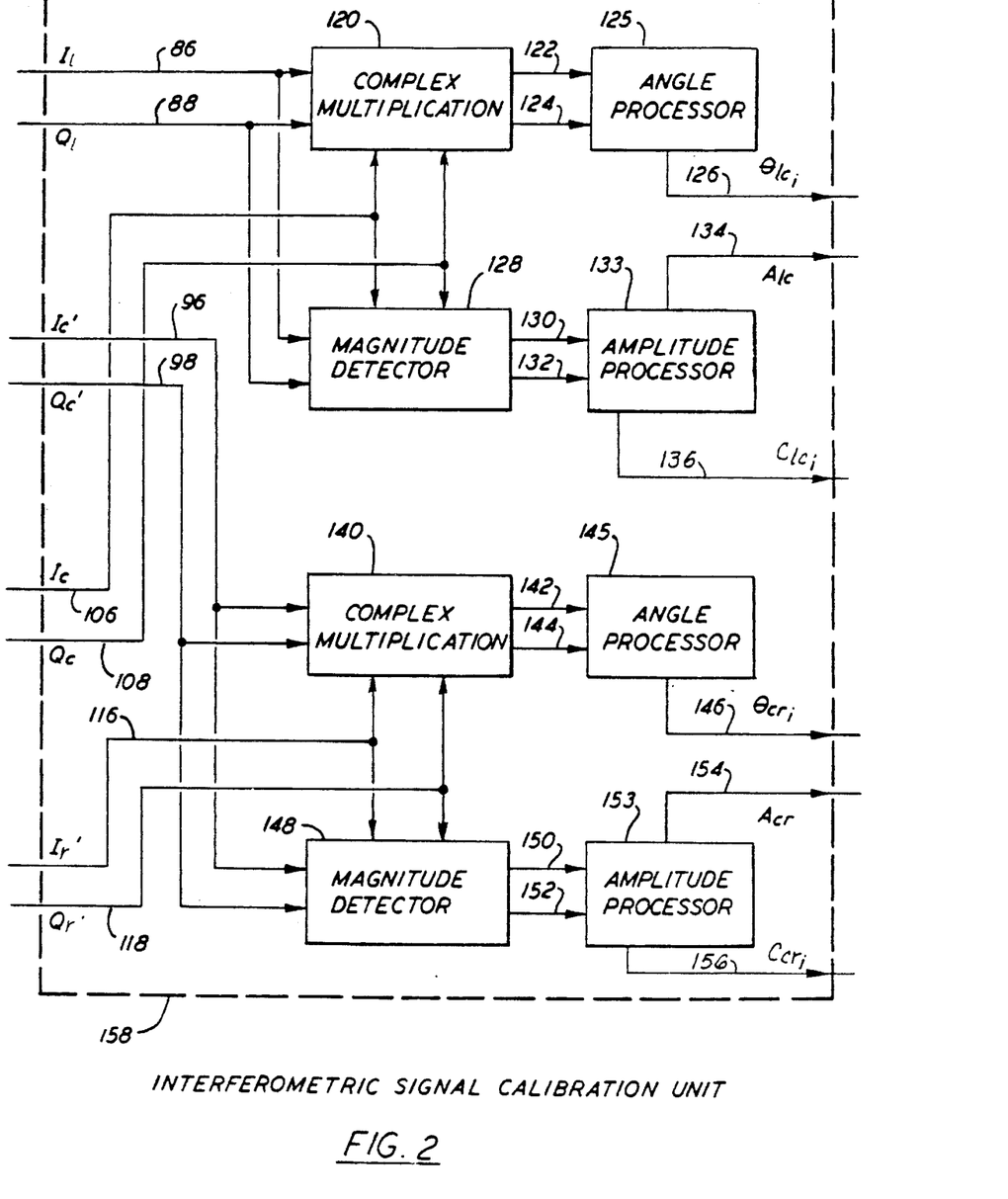
FIG. 2 is a drawing in block form of the triple interferometric signal calibration unit shown in FIG. 1.

A particular feature of the present invention is that the triple interferometric signal calibration unit utilizes the range gated doppler filtered multiple channel signal information and generates phase and amplitude calibration signals as well as a measure of clutter power. Referring now to FIG. 2, one embodiment of the triple interferometric signal calibration unit will now be described. The triple interferometric signal calibration unit is essentially composed of two halves, one which operates on the left and center apertures and the other which operates on the right and center apertures. First considering the left and center half, a complex multiplication unit 120 is provided and is connected by two lines 86 and 88 to receive the phase and quadrature components of the range doppler map from the FFT processor 84. The complex multiplier unit 120 is also connected to the lines 106 and 108 to receive the in-phase and quadrature components of the range doppler map from the digital FFT processor 104. The output from the complex multiplication unit 120 is an in-phase and quadrature range doppler map which represents the phase angle between the two input signal sets and this information is presented via the lines 122 and 124 to an angle processor 125. Angle processor 125 performs a linear regression on the phase data in each range bin and derives a linear frequency versus angle relationship for each range bin. It then averages all the range data to derive a best estimate of angle versus doppler information. The output from the angle processor 125 is provided as a phase calibration signal on the line 126 and this signal $\theta_{1c_i}$ represents the measured angle versus doppler interferometer characteristic. Each half of the calibration unit also includes a magnitude detector, such as magnitude detector 128 and measures the magnitude of the complex vectors in both range-doppler maps of the left and center apertures. The magnitude detector 128 receives the output of FFT processor 84 on lines 86 and 88 and the output of the FFT processor 104 on lines 106 and 108. The output from the magnitude detector 128 is presented on the lines 130 and 132 to the amplitude processor 133. The signals on this line represent the magnitude of the range-doppler map from the left aperture and the range-doppler map from the center aperture. The amplitude processor 133 averages all of the range information on both maps to provide a signal which represents average clutter power, $C_{lc_l}$, versus doppler frequency data on line 136. The amplitude processor 133 also provides an amplitude calibration signal $A_{1c}$ on the line 134 which is the ratio of the average clutter powers on the left and center apertures.

In a similar fashion, the other half of the triple interferometric signal calibration unit also includes a complex multiplication unit 140 which is connected to the digital FFT processor 94 to receive the range-doppler map from the center channel and also to the digital FFT processor 114 to receive the right aperture range doppler map. An angle processor 145 produces an output on the line 146, $\theta_{cr}$, which is the measured angle versus doppler characteristic of the right and center apertures. A magnitude detector 148 receives a complex range-doppler map from the right aperture and the center aperture and provides respective range doppler magnitudes to an amplitude processor 153. The amplitude processor 153 provides on the line 156 a signal which represents the average clutter power, $C_{cr}$, of the center and right maps as a function of doppler frequency. As before, the amplitude processor 153 also provides an amplitude calibration signal $A_{cr}$ on the line 154 which is the ratio of the average clutter power in the center and right apertures.

Figure 3:
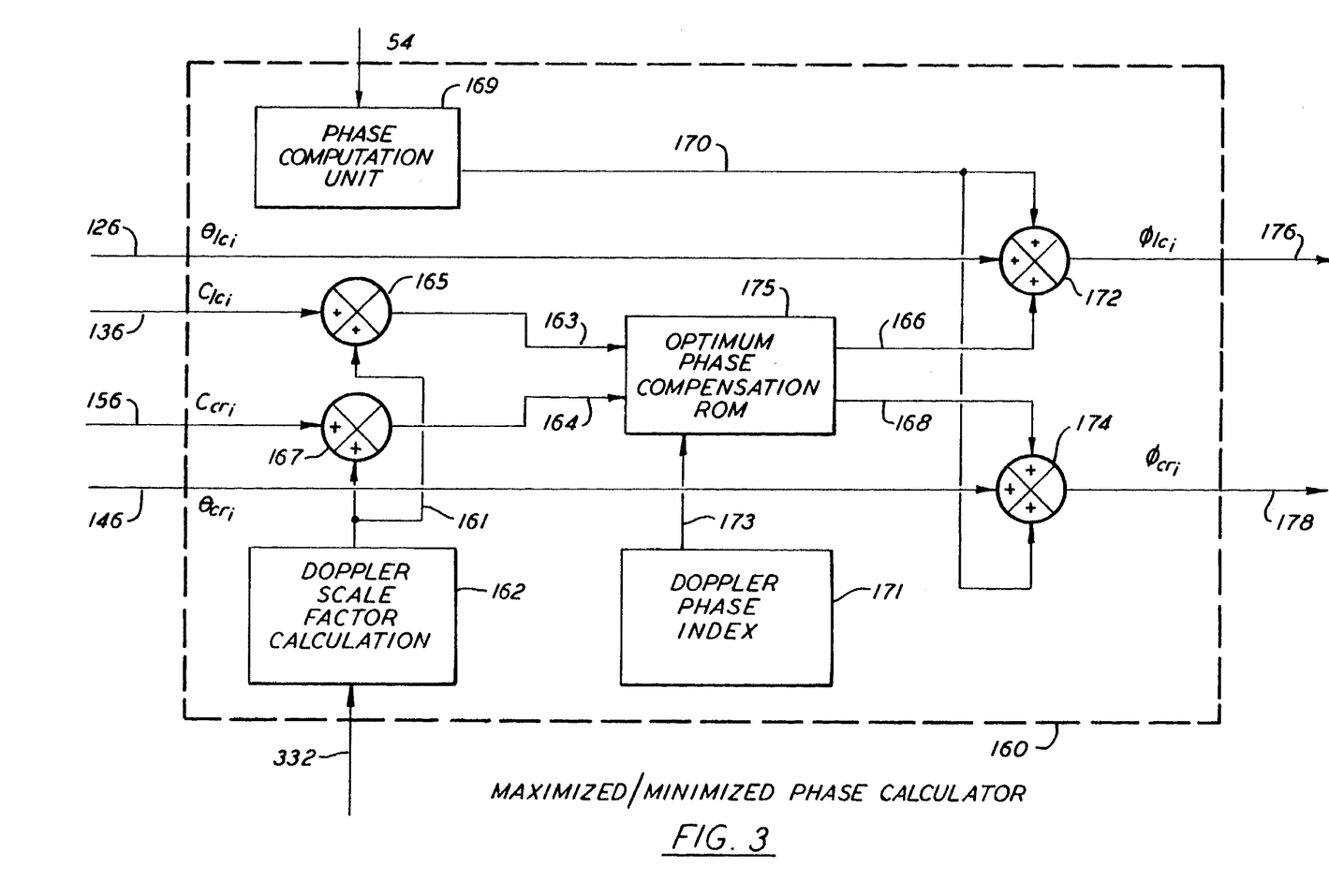
FIG. 3 is a drawing in block diagram form of one embodiment of the maximized/minimized phase calculator of FIG. 1.

Phase correction calculation is performed twice by two passes through a maximized/minimized phase calculator unit 160 in the following manner. The maximized/minimized phase calculator is used first to provide maximum target to clutter plus noise (T/C+N) for detection, and second to minimize the angle measurement error in the detected targets.

The basis for the use of the phase correction values generated in the maximized/minimized phase calculator 160 is the fact that both output target and clutter signals can be controlled by the phase correction applied between adjacent interferometers. The output target, T, to clutter, C, plus noise, N, ratio which governs target detectability is given by $$\frac{T_o}{N_o + C_o} = \frac{T_i 2 \sin^2\left(\frac{\phi_f}{2} + \frac{\phi_c}{2}\right)}{N_i + C_i 2 \sin^2\left(\frac{\phi_c}{2}\right)} \quad (1)$$

$$= \frac{T_i}{N_i} \cdot \frac{1 - \cos(\phi_f + \phi_c)}{1 + \frac{C_i}{N_i}(1 - \cos\phi_c)}$$

where $T_o$, $N_o$ and $C_o$ are output quantities, $T_i$, $N_i$ and $C_i$ are input quantities, $\phi_f$ is a doppler related phase quantity, and $\phi_c$ is an additional and yet unknown phase quantity applied between adjacent interferometers.

Figure 6:
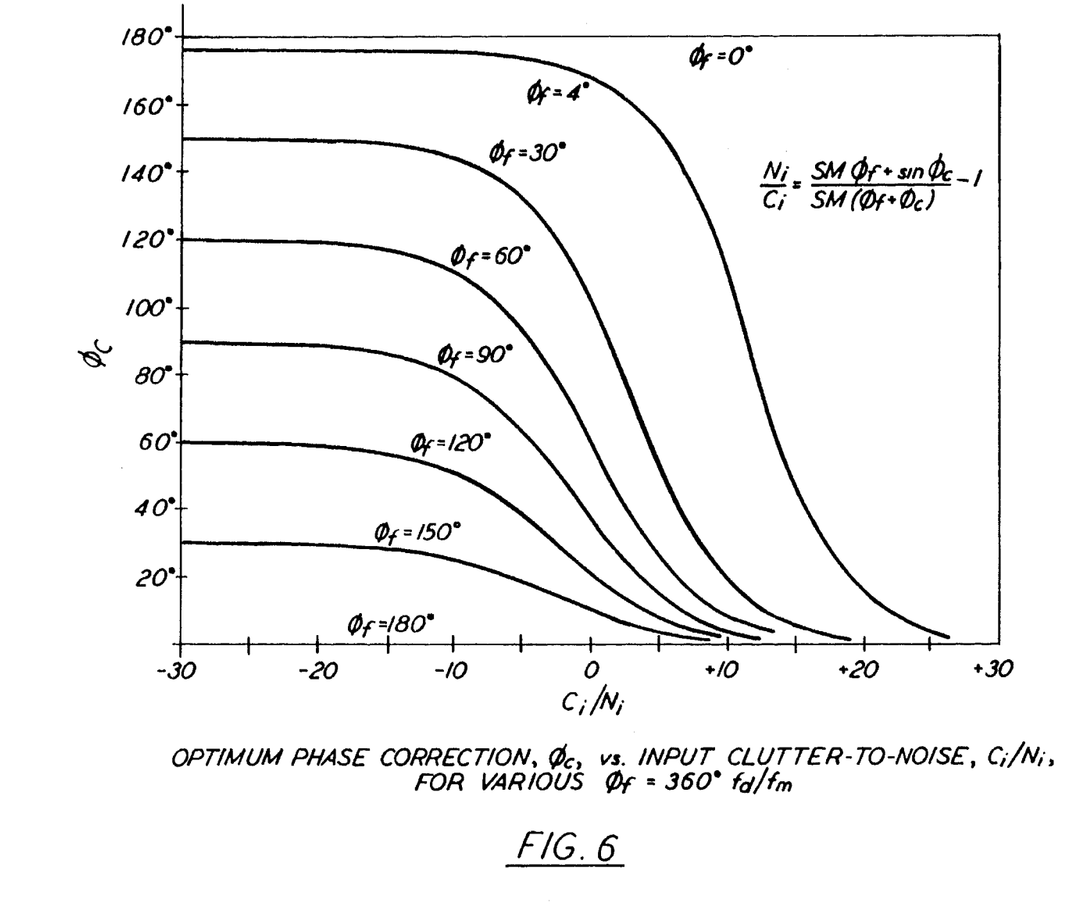
FIG. 6 is a graph of optimum phase correction, $\phi_c$, versus input clutter-to-noise $C_i/N_i$.

In order to find the value of $\phi_c$ which will create a maximum $T_o/(N_o+C_o)$ a partial derivative of the expression is taken with respect to the variable $\phi_c$ and set to zero. Due to the fact that the above expression involves a ratio of terms each containing $\phi_c$, the resultant expression equates the product of the numerator and the partial derivative of the denominator to the product of the denominator and the partial derivative of the numerator. As a result, $$\left(1 + \frac{C_i}{N_i}(1 - \cos\phi_c)\right) \cdot \sin(\phi_f + \phi_c) = (1 - \cos(\phi_f + \phi_c)) \cdot \frac{C_i}{N_i} \sin\phi_c \quad (2)$$

and after simplification $$\left(1 + \frac{C_i}{N_i}\right) \sin(\phi_f + \phi_c) = \frac{C_i}{N_i} \sin\phi_f + \frac{C_i}{N_i} \sin\phi_c \quad (3)$$

or $$\frac{N_i}{C_i} = \frac{\sin\phi_f + \sin\phi_c}{\sin(\phi_f + \phi_c)} - 1 \quad (4)$$

as depicted in FIG. 6.

In order to adapt the results of the analysis presented above for target detectability to the case of target angle measurement one must formulate both the noise and clutter related source of error. This is given by $$\sigma_n^2 + \sigma_c^2 = \sigma_t^2 = \frac{K_1^2}{T_o/N_o} + \frac{K_2^2}{T_o/C_o} = \frac{K_1^2 N_o + K_2^2 C_o}{T_o} \quad (5)$$

where $\sigma_n$, $\sigma_c$ and $\sigma_t$ are the standard deviations of the noise and clutter related errors and the combined total error and $K_1^2$ and $K_2^2$ are scaling constants of the radar system. For the proposed configuration $$K_1^2 = \frac{\lambda^2}{8\pi^2 d^2} \quad (6)$$

and $$K_2^2 = \left(\frac{\lambda f_t}{2v}\right)^2 \quad (7)$$

where $\lambda$ is system wavelength, d is array spacing, $f_t$ is target doppler and v is aircraft velocity perpendicular to the antenna orientation. It is recognized that, except for the constant $K_1^2$ multiplying $N_o$ and the constant $K_2^2$ multiplying $C_o$ the expression for $\sigma_t^2$ in equation (5) is the inverse of the expression (1) first presented for the target to clutter plus noise ratio. As a result, the value of $\sigma_t$ can be minimized by using a phase correction value $\sigma_c$ given by equation (4) with the modification $$\frac{C_i}{N_i} = \frac{K_2^2}{K_1^2} \cdot \frac{C_i}{N_i} = 2\left(\frac{\pi d}{v}\right)^2 f_t^2 \cdot \frac{C_i}{N_i} \quad (8)$$

by defining a matched PRF, $f_m$, as $$f_m = \frac{2v}{d} \quad (9)$$

we have $$\frac{C_i}{N_i} = 8\pi^2 \left(\frac{f_t}{f_m}\right)^2 \cdot \frac{C_i}{N_i} \quad (10)$$

As a result, after identifying the target doppler, $f_t$, the quantity $8\pi^2(f_t/f_m)^2$ can be calculated and added to $C_i/N_i$ (after being converted to log format) to create a new value of $C_i'/N_i$ for which a new value of phase $\phi_c$ can be used to improve the angle measurement.

An example is provided here with typical system and signal parameters assumed to illustrate the use of the phase $\phi_c$ first to maximize target detectability and second to minimize angle measurement error. The values assumed are $T_i/N_i$=+10 dB, $C_i/N_i$=−5 dB, $\phi_f$=90°, $K_1$=9.2 mr and $K_2$=20.5 mr. As a result, $C_i'/N_i$=+2 dB. The phase values obtained from FIG. 6 are $\phi_c$=63° for detection purposes and $\phi_c$=27° for angle measurement purposes. The results appear in Table 1 shown below.

TABLE 1

| Output Quantities | Non-Optimized $\phi_c = 0°$ | Optimized For Detection $\phi_c = 63°$ | Optimized For Angle Measurement $\phi_c = 27°$ |
|---|---|---|---|
| $T_o/N_o$, dB | 10.0 | 12.8 | 11.6 |
| $T_o/C_o$, dB | 45.0 | 20.4 | 26.3 |
| $T_o/(N_o + C_o)$, dB | 10.0 | 12.1 | 11.5 |
| $\sigma_n$, mr | 2.91 | 2.11 | 2.42 |
| $\sigma_c$, mr | 0.12 | 1.96 | 0.99 |
| $\sigma_t$, mr | 2.91 | 2.88 | 2.61 |

The gain in target to clutter plus noise is 2.1 dB for the optimized case versus the nonoptimized case. This can translate into a significant (approximately 20%) gain in target detectability. Additionally, angle accuracy is improved by at least 10% for the optimized case versus the nonoptimized case.

The sensitivity of the output quantities $T_o/(N_o+C_o)$ and $\sigma_t$ to variations in the input $C_i/N_i$ is slight so that near optimum results are maintained for at least a 3 dB deviation between measured and actual clutter-to-noise levels.

On the first pass, clutter-to-noise information as a function of doppler frequency is presented on the lines 136 and 156 to the summing nodes 165 and 67, respectively. On this pass each of these summing nodes is presented with no information from the line 161 and this input will be described in greater detail hereinafter. This means that the input clutter-to-noise information is unaltered and presented on the lines 163 and 164 to the optimum phase compensation ROM 175. The inputs on the lines 163 and 164 are from the left center aperture and the center right aperture, respectively. The optimum phase compensation ROM takes the input clutter to noise signals and doppler phase information on line 173 from the doppler phase index unit 171 and reads out a phase correction value for each doppler filter which will produce maximum target to clutter plus noise. A more-complete understanding of the information stored in the optimum phase compensation ROM 175 will be better understood with reference to FIG. 6. The abscissa shown are input clutter-to-noise ratios in dB ranging from minus 30 to plus 30. The ordinate is the phase correction value, $\phi_c$, from 0° up to 180°. A family of curves is shown for various values of $\phi_f$ between 0° and 180° which is a doppler frequency related phase. For negative values of $\phi_f$ the phase correction values $\phi_c$, would be the negative of those shown on the graph.

One typical example of an optimum phase compensation ROM 175 would be two-dimensional array storage six by seven bits in which seven-bit phase numbers are stored. This would operate, for example, with clutter-to-noise inputs quantized to one dB resolution, $\phi_f$ values from the doppler phase index quantized to roughly 1.5° of resolution. Outputs from the phase compensation ROM, $\phi_c$, are angles quantized to a similar degree of resolution. Outputs from the optimum phase compensation ROM 175 are presented along the lines 166 and 168 to summing nodes 172 and 174, respectively. Also presented to the summing nodes on the lines 126 and 146 are the signals $\theta_{1c_i}$ and $\theta_{cr_i}$ that present the angle versus doppler interferometric data which is derived in the triple interferometric signal calibration unit 158, described hereabove. Each summing node is presented with a third bit of phase information from the phase computation unit 169. This represents the phase difference between the delayed and undelayed data sets. The phase adders 172 and 174 essentially sum the phases of all the signals presented thereto to derive output phase correction signals $\phi_{1c_i}$ and $\phi_{cr_i}$ on the lines 176 and 178. As will be appreciated, in those cases where the sum of the phase exceeds 360°, the phase calculation rolls over and begins again at zero.

Figure 7:
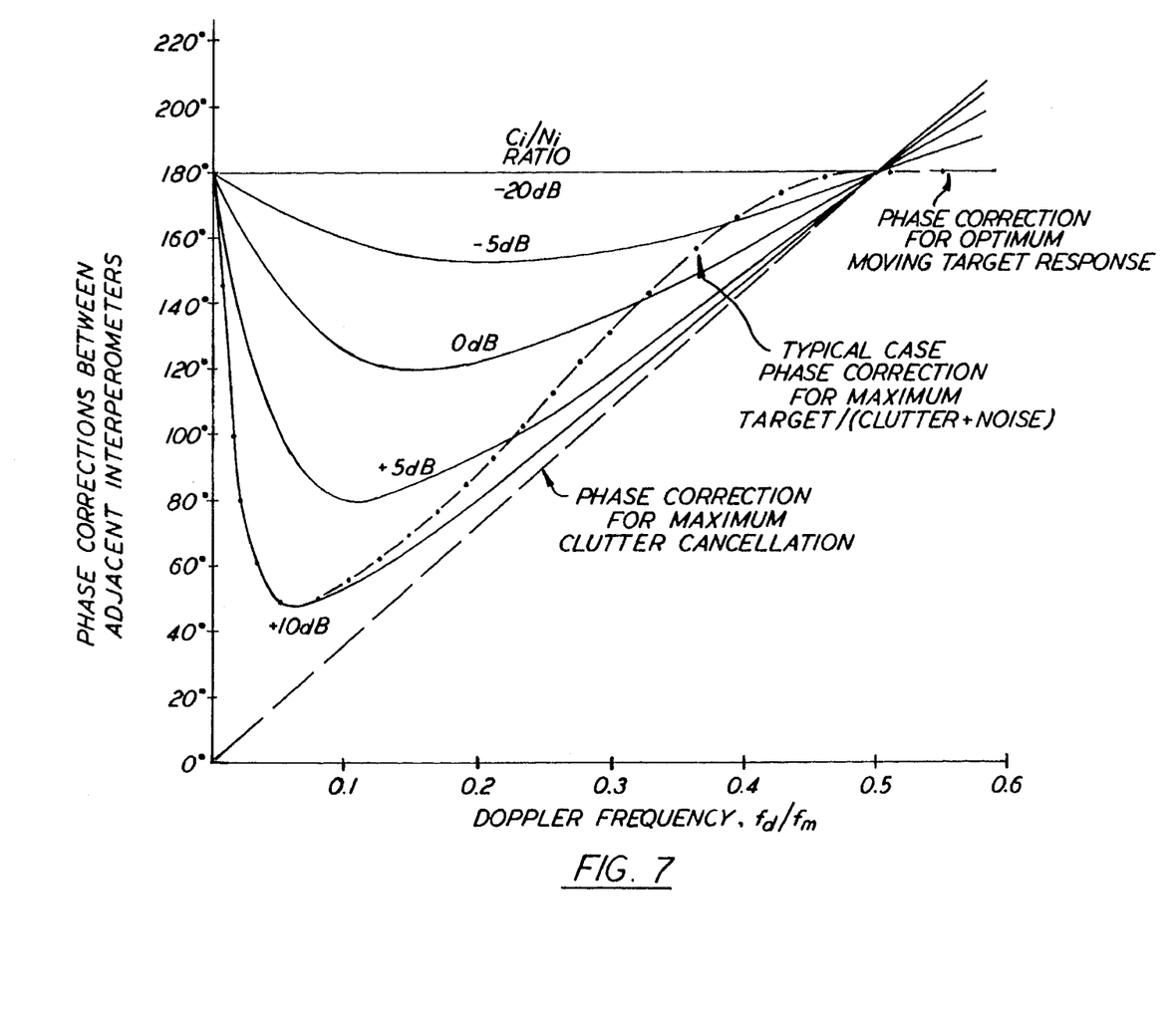
FIG. 7 is a graph showing phase corrections between adjacent interferometers as a function of doppler frequency.

Referring now to FIG. 7, there is seen a graph depicting the phase correction between adjacent interferometer on lines 176 and 178 versus a function of doppler frequency and clutter-to-noise ratio. Recognizing that the clutter-to-noise ratio decreases with increasing doppler frequency (this being a function of antenna pattern) the dotted line represents a typical case for phase correction for maximum target-to-clutter plus noise.

A significant aspect of the present invention involves the difference between this correction and the piecewise linear correction utilized in previous phase correction processing. The difference between the typical case and the piecewise linear curve provides for enhanced target signal strength. Stated in another way, $\phi_{1c_i}$ and $\phi_{crdi\ i}$ are composite signals representing a time delay phase correction, the positional phase relationship between adjacent interferometers and a phase which will provide optimum target properties.

Figure 4:
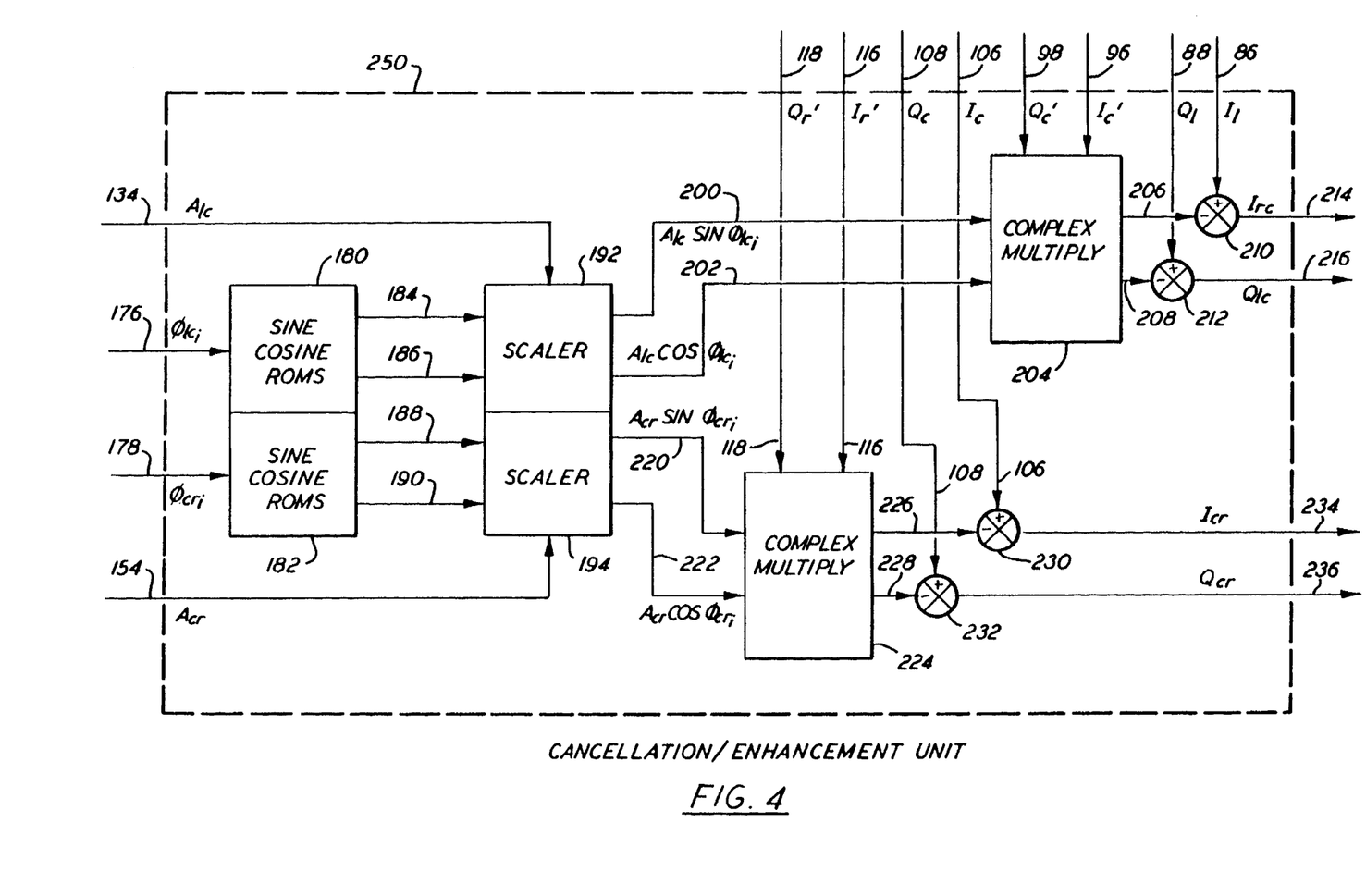
FIG. 4 is a drawing in block diagram form of the cancellation unit shown in FIG. 1.

The phase correction signals are fed to the cancellation unit 250. Lines 176 and 178 go to a sine-cosine ROM 180 and a sine-cosine ROM 182, respectively. The sine and cosine ROMs calculate the sine and cosine associated with the respective values of phase fed thereto. The output from the ROMs 180 and 182 are fed out on the lines 184, 186, 188 and 190 to scaling units 192 and 194. These signals are the cos ($\phi_{1c_i}$), the sin ($\phi_{1c_i}$), the cos ($\phi_{cr_i}$) and the sin ($\phi_{cr_i}$) and are fed to scaling units 192 and 194. Each of the scaling units in the cancellation unit 250 is also connected to the triple-interferometric signal calibration unit 158. The amplitude calibraiton signals presented to the scaling units is related to the amplitude difference in clutter spectrum between adjacent apertures for the respective interferometer. These signals ,are then combined with the output signals from the sine and cosine ROMs 180 and 182. The amplitude correction is a multiplication factor on the sine and cosine outputs from the ROMs. The output from .the scaling unit 192 is fed via lines 200 and 202 to, the complex multiplication unit 204 while the output from the scaling unit 194 is fed via lines 220 and 222 to the complex multiplication unit 224. The signals on these lines are correction factors which are to be applied to the delayed data sets which are the outputs of the digital FFT processors 94 and 114.

A particular feature of the present invention is that the outputs of the FFT processors 94 and 114 which process the delayed data sets are complex multiplied in units 204 and 224, the complex multiplication factors being calculated by a particular process of the present invention. Complex multiply unit 204 accepts as inputs $I_c$ and $Q_c$ on lines 96 and 98 which are the output of processor 94 and lines 200 and 202 which represent the amplitude and phase correction signals $A_1 \cos\phi_{1c_i}$ and $A_{1c} \sin\phi_{1c_i}$. The complex multiplication unit 204 serves to scale the vector represented by signal lines 96 and 98 by a factor $A_{1c}$ and to rotate the vector by a phase $\phi_{1ci}$ (the subscript i indicating segmentation in doppler frequency). Likewise, unit 224 accepts as inputs $I_r$ and $Q_r$ on lines 116 and 118 which are the output of processor 114 and lines 220 and 222 which represent the amplitude and phase correction signals $A_{cr} \cos\phi_{cr_i}$ and $A_{cr} \sin_{1cr_i}$. The complex multiplication unit 224 serves to scale the vector represented by signal lines 116 and 118 by a factor $A_{cr}$ and to rotate the vector by a phase $\phi_{cr_i}$.

The outputs of complex multiplication unit 204 appear on signal lines 206 and 208 and represent compensated center aperture information. These signal lines go to summing units 210 and 212, respectively. The outputs of complex multiplication unit 224 appear on signal lines 226 and 228 and represent compensated right aperture information. These signal lines are fed to summing units 230 and 232, respectively. The subtraction of compensated center aperture information on lines 206 and 208 from uncompensated left aperture information $I_1$ and $Q_1$ on lines 86 and 88 takes place in summing units 210 and 212, respectively. The subtraction of compensated right aperture information on lines 226 and 228 from uncompensated center aperture information $I_c$ and $Q_c$ on lines 106 and 108 takes place in summing units 230 and 232, respectively. The outputs of the summing units 210 and 212 appear on signal lines 214 and 216 and are the clutter cancelled signals $I_{1c}$ and $Q_{1c}$. The outputs of the summing units 230 and 232 appear on signal lines 234 and 236 and are the clutter canceled signals $I_{cr}$ and $Q_{cr}$. At this point, these two output signal pairs from the cancellation unit 250 possess greatly enhanced signal characteristics. That is, by the use of the phase values stored in the optimum phase compensation ROM we have, in each doppler filter, created maximum target-to-clutter plus noise characteristics for any moving target in the PRF interval. This information is then presented to a detection and validation processor 350.

Figure 5:
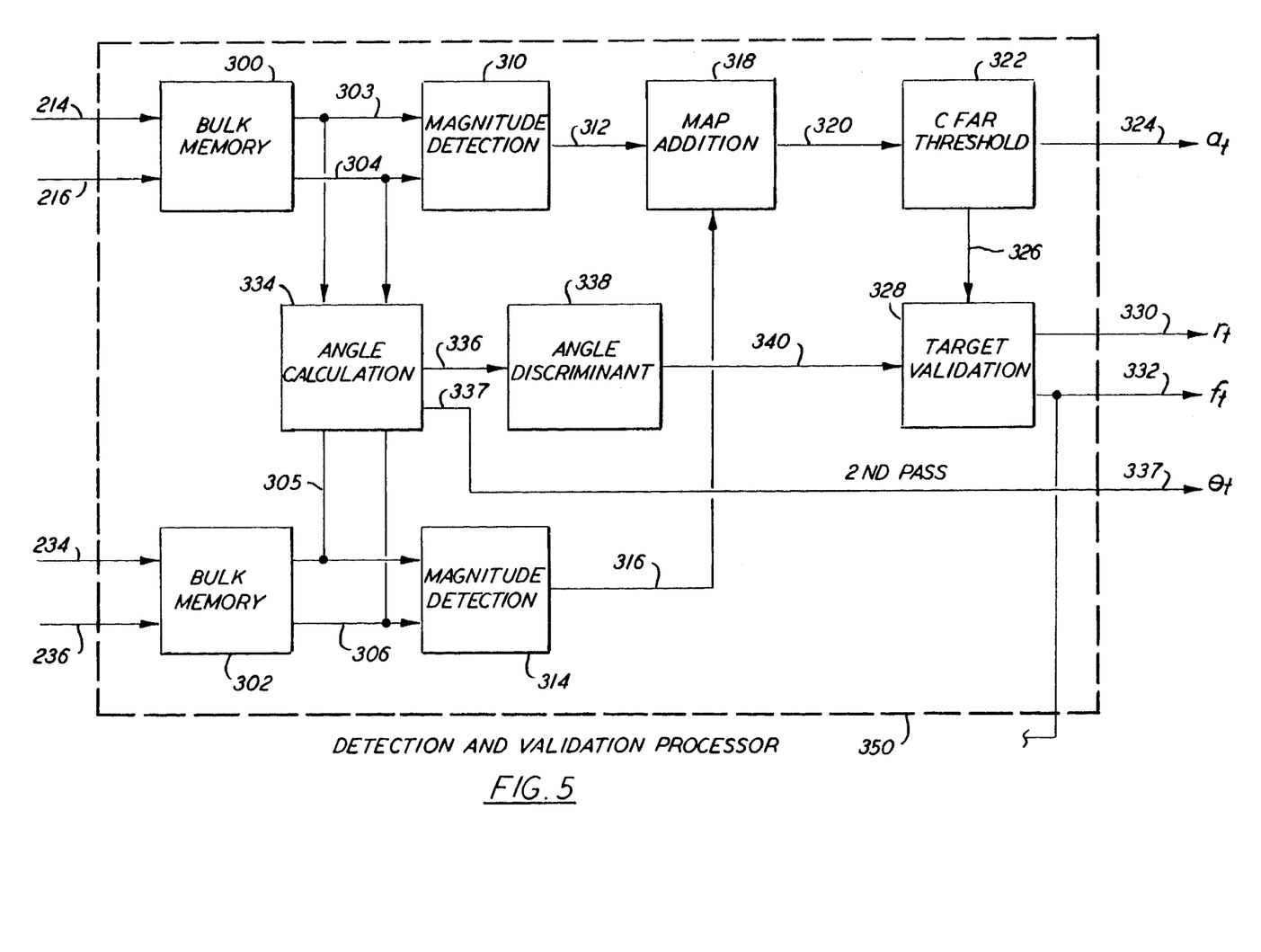
FIG. 5 is a drawing in block diagram form depicting the detection and validation processor shown in FIG. 1.

The $I_{1c}$ signal on the line 214 and the $Q_{1c}$ signal on the line 216 are fed into and stored in the bulk memory unit 300 while the $I_{cr}$ signal on the line 234 and the $Q_{cr}$ signal on the line 236 are stored in the a bulk memory unit 302. These memory units are sized so that they contain $2N_b$ bits of information for $N_r$ range bins by $N_d$ doppler filters. The detection of moving targets which possess maximized signal to clutter plus noise characteristics is performed in the detection and validation processor 350. Magnitude detectors 310 and 314 are connected to the output of the bulk memory units 300 and 302, respectively, and perform a conventional magnitude detection routine on the information stored in the bulk memory which involves taking the larger of the two quadrature components and adding to it one-half of the smaller component. This is a sufficiently accurate representation of true magnitude. The outputs of the magnitude detectors are signal lines 312 and 316 which go to a map addition unit 318. This unit adds magnitudes for each of $N_r$ range cells by $N_d$ doppler filters from its two input lines. The resultant range doppler map on signal line 320 goes to a CFAR type thresholding circuit 322. Average signal levels are computed in the range and/or doppler dimension. and potential targets are declared if they exceed the local averages by a predetermined threshold factor. The outputs 326 are then stored temporarily while target angle processing is completed. The outputs of the bulk memory units 300 and 302 which represent the signals $I_{1c}$, $Q_{1c}$, $I_{cr}$ and $Q_{cr}$ are presented to an angle calculation unit 334. This consists of a complex multiplier unit of conventional design and would typically contain four multipliers and two summing devices in which the inputs are complex multiplied to obtain complex signals from which the angle to the target can be derived. Also included in the angle calculation unit 334 is an arc tangent ROM which takes the in-phase and quadrature information and derives an electrical phase angle. The electrical phase angle is then scaled by the interferometer scale factor to give the true angular field position for all signals in the total map of $N_r$ range bins by $N_d$ doppler filters and appears on signal line 336.

An angle discrimination unit 338 is connected to the angle calculation unit 334 and evaluates the angular information of all signals against the known angle doppler interferometric relationship. A discrete window is provided about the known linear relationship and signals falling within the discrete window will be identified as fixed targets and rejected. Candidate signals falling outside the discrete window will be identified as potential moving targets and will pass to the target validation unit 328 on signal line 340. The target validation unit correlates potential moving targets which have passed an amplitude threshold on signal line 326 with potential moving targets which have passed an angle discrimination test on signal line 340. The output of the target validation unit is the range, $r_t$, and doppler, $f_t$, locations of the true moving targets which have passed both amplitude and angle conditions on signal lines 330 and 332. Available on signal line 324 is rude information, $a_t$, for these moving targets. The angle information on line 336 is not outputted at this time because it does not represent the best estimate of moving target angle available.

To provide angle measurement with minimum error doppler information for detected moving targets is used in a second pass via the line 332 to the doppler scale factor Calculation unit 162 in the maximized/minimized phase calculator 160. The doppler scale factor calculation unit 162 performs the calculation of $2(\pi d/v)^2 f_t^2 = K_2^2/K_1^2$ by converting target doppler to an effective clutter versus noise parameter.

The output from the doppler scale factor calculation unit 162 is presented via the line 161 to the summing nodes 165 and 167 and modifies the input clutter signals on the lines 136 and 156. At this point, the modified phase data passes through the remaining portion of the maximized/minimized phase calculator and is presented to the cancellation unit 250. It should be recognized that the phase correction between adjacent interferometers on the lines 176 and 178 is different from the corresponding information in the first pass. The processing in the cancellation unit is identical to that described in the first pass; however, it should be recognized that the number or range-doppler cells being processed during this second pass are only those in which moving targets were detected in the first pass.

The output from this second pass through the cancellation unit 250 is presented to the detection and validation processor 350 in the same manner as described. On this second pass through the detection and validation processor only the angle calculation to the moving target is performed. In other words, the processes such as magnitude detection, map addition, CFAR thresholding, angle discrimination and target validation as described in the first pass are not performed in this second pass. The target angle calculation, $\theta_t$, on line 337 that is outputted from the detection and validation processor is that angle which was calculated during this second pass. This angle measurement has the minimum amount of measurement error that can be achieved with the input signal parameters.

Although this invention has been shown and described with respect to a preferred embodiment, it will be understood by those skilled in this art that various changes in form and detail thereof may be made without departing from the spirit and scope of the claimed invention.

I claim:

1. A method for processing radar returns in an interferometric moving platform radar comprising:

calculating a phase correction signal based on a maximum ratio of target-to-noise plus clutter in a first pass;

recalculating the phase correction signal based on minimum target angle measurement error; and applying the phase correction signal to the radar returns for eliminating clutter.

2. A method according to claim 1 wherein the phase correction signal is recalculated on the basis of the target doppler measurement in the first pass, and wherein said target doppler is fed back to a doppler scale factor calculation means and is scaled by a factor of:

$$2(\pi d/v)^2 f_t^2$$

where:
d=interarray spacing,
v=aircraft velocity,
$f_t$=target doppler.

3. A phase-optimized airborne moving target indicator (AMTI) for effectively detecting and measuring slowly moving targets in main beam clutter from a moving platform, comprising:

antenna means having a transmit aperture for transmitting radar pulses at a pulse repetition frequency (PRF), and having three spaced-apart receive apertures; a left aperture, a center aperture, and a right aperture for receiving radar return signals;

receiver means for providing in-phase (I) and quadrature (Q) component signals associated with each receive aperture in response to the radar return signals;

means for providing I and Q signals associated with a receive aperture that are delayed as a function of the PRF;

means for providing a clutter cancelled signal related to the left and center apertures as a function of the difference between the delayed center aperture I and Q signals and the left aperture I and Q signals in response to phase correction signals indicative of a time delay phase correction, the positional phase relationship between adjacent apertures and a phase due to motion of the targets and for providing a clutter cancelled signal related to the center and right apertures as a function of the difference between the delayed right aperture I and Q signals and the center aperture I and Q signals in response to phase correction signals indicative of a time delay phase correction, the positional phase relationship between adjacent apertures and a phase due to motion of the targets, characterized by:

maximized/minimized phase calculation means for providing the phase correction signals as a function of the average clutter power versus doppler frequency for adjacent apertures for a maximum ratio of target-to-clutter plus noise and minimum angle measurement error.

4. A phase-optimized airborne moving target indicator (AMTI) for effectively detecting and measuring slowly moving targets in main beam clutter from a moving platform, comprising:

antenna means having a transmit aperture for transmitting radar pulses at a pulse repetition frequency (PRF), and having three spaced-apart receive apertures; a left aperture (12), a center aperture (14), and a right aperture (16) for receiving radar return signals;

receiver means (18, 20, 22) for providing in-phase (I) and quadrature (Q) component signals associated with each receive aperture in response to the radar return signals;

clock means (51) for providing a timing signal (52) related to each transmitted radar pulse;

delay means (53) for providing a delay signal in response to platform movement, PRF and interaperture spacing;

storage means (70, 72, 74, 76) for providing delayed and undelayed sets of data in a time domain format in response to the timing signal, the delay signal and the in-phase and quadrature component signals;

FFT means (84, 94, 104, 114) for providing delayed and undelayed sets of data in a frequency domain format in response to the delayed and undelayed sets of data in time domain format;

interferometer means (158) connected to the FFT means for providing phase calibration signals (126, 146) indicative of the measured angle versus doppler characteristic for a left/center interferometer comprising the left and center apertures and a center/right interferometer comprising the center and right apertures in response to the delayed and undelayed sets of data in frequency domain format, and for providing amplitude calibration signals (134,154) indicative of the ratio of the average clutter powers for the left/center and center/right interferometers in response to the delayed and undelayed sets of data in frequency domain format;

phase computation means (169) for providing a phase difference signal indicative of the phase difference between the delayed and undelayed data sets of data in response to the delay signal;

phase calculation means (160) for providing phase correction signals for the left/center and center/right interferometers indicative of a time delay phase correction, the positional phase relationship between adjacent apertures, and a phase due to motion of the targets in response to the coherent addition of the phase difference signals and the phase calibration signals;

cancellation means (250) for providing clutter-cancelled in-phase and quadrature component signals that have significantly suppressed clutter characteristics in response to the phase correction signals, the amplitude calibration signals and the delayed and undelayed sets of data in frequency domain format; and detection means (350) for providing range ($r_t$), doppler ($f_t$), amplitude ($a_t$), and angle ($_t$) signals indicative of target motion in response to the clutter cancelled in-phase and quadrature component signals, characterized by:

means (133,153) for providing average clutter power signals (136,156) indicative of the average clutter power versus doppler frequency for adjacent aperture interferometers in response to the delayed and undelayed sets of data in frequency domain format; and means (161–168,171–175) for providing an offset signal to optimize the phase correction signals in response to the average clutter power signals and the doppler signal in order to provide a maximum ratio of target-to-clutter plus noise and minimum angle measurement error.

* * * * *